(12) United States Patent
Herring

(10) Patent No.: US 7,251,243 B2
(45) Date of Patent: Jul. 31, 2007

(54) METHOD AND SYSTEM FOR COMMUNICATING BROADBAND CONTENT

(75) Inventor: Malcolm Herring, San Francisco, CA (US)

(73) Assignee: Tut Systems, Inc., Lake Oswego, OR (US)

( * ) Notice: Subject to any disclaimer, the term of this patent is extended or adjusted under 35 U.S.C. 154(b) by 1036 days.

(21) Appl. No.: 10/063,000

(22) Filed: Jan. 30, 2002

(65) Prior Publication Data

US 2003/0142667 A1  Jul. 31, 2003

(51) Int. Cl.
*H04L 12/28* (2006.01)

(52) U.S. Cl. ............ 370/389; 370/432; 370/437; 370/439; 370/462; 375/222

(58) Field of Classification Search .......... 370/431, 370/437, 439, 443
See application file for complete search history.

(56) References Cited

U.S. PATENT DOCUMENTS

| | | | |
|---|---|---|---|
| 6,393,008 B1* | 5/2002 | Cheng et al. ............ 370/338 |
| 6,424,657 B1* | 7/2002 | Voit et al. ............ 370/412 |
| 6,643,253 B1* | 11/2003 | Smith ............ 370/217 |
| 6,798,769 B1* | 9/2004 | Farmwald ............ 370/352 |
| 6,829,246 B2* | 12/2004 | Silberman et al. ............ 370/463 |
| 2002/0159467 A1* | 10/2002 | Kirshenboim et al. ............ 370/410 |
| 2003/0046476 A1* | 3/2003 | Chong ............ 710/316 |
| 2004/0010592 A1* | 1/2004 | Carver et al. ............ 709/226 |

* cited by examiner

*Primary Examiner*—Huy D. Vu
*Assistant Examiner*—Roberta A. Shand
(74) *Attorney, Agent, or Firm*—Smith-Hill and Bedell

(57) ABSTRACT

A method of, and an apparatus for, providing broadband services to multiple remote units located at a client premise via a single communication line are provided. Authorization data is communicated from distribution equipment to the remote units and the authorization data authorizes one of the remote units to transmit data to the distribution equipment. The authorization data is included in a DSL frame and is sequentially changed thereby sequentially to authorize each remote unit one at a time to transmit data. The distribution equipment provides the authorization data in a control word of a frame header of a VDSL frame.

27 Claims, 7 Drawing Sheets

METHOD AND SYSTEM FOR COMMUNICATING BROADBAND CONTENT

FIELD OF THE INVENTION

The present invention relates generally to the field of broadband communication and, more specifically, to a system for, and a method of, communicating broadband content to a plurality of remote units. It also relates to a remote unit and distribution equipment.

BACKGROUND OF THE INVENTION

Service providers use various types of communication lines to provide broadband content to users. In order to utilize conventional telephone networks, various technologies have been developed. An example of such a technology is digital subscriber line or DSL technology. Examples of DSL technology include asymmetrical DSL (ADSL), symmetrical DSL (SDSL), very-high-bit-rate DSL (VDSL) or the like. Due to the various different types of DSL, reference is often generically made to xDSL. The xDSL technology allows broadband content (including voice, data and video) to be communicated over existing, relatively rudimentary, communication networks such a conventional copper wires forming part of a plain old telephone service (POTS). For the purposes of this specification, the application of the invention to xDSL technology should be predominantly, but not exclusively, borne in mind.

SUMMARY OF THE INVENTION

In accordance with the invention, there is provided a method of providing broadband services to a plurality of remote units located at a client premise via a single communication line, the method including communicating authorization data from distribution equipment to the remote units, the authorization data authorizing one of the remote units to transmit data to the distribution equipment.

Further in accordance with the invention, there is provided a system for providing broadband services, the system including:

distribution equipment connected to at least one content provider and configured to provide the broadband services via a plurality of subscriber communication lines; and a plurality of remote units connectable to each subscriber communication line, the distribution equipment being configured to communicate authorization data to the remote units that authorizes the remote units to transmit data to the distribution equipment one at a time.

Still further in accordance with the invention, there is provided a remote unit for receiving broadband services via a communication line, the remote unit including:

interface circuitry to interface the remote unit to a user device;

a receiver connected to the interface circuitry for receiving downstream data from distribution equipment; and a transmitter connected to the interface circuitry, the transmitter transmitting upstream data to the distribution equipment upon authorization by the distribution equipment.

In accordance with a yet further aspect of the invention, there is provided distribution equipment which includes:

a network interface to interface the distribution equipment to at least one broadband content provider; and a communication interface to interface the distribution equipment to a communication line to which a plurality of remote units are connectable, the distribution equipment being operable to control upstream transmission of data by each remote unit.

Other features of the present invention will be apparent from the accompanying drawings and from the detailed description which follows.

DESCRIPTION OF THE DRAWINGS

The invention is now described, by way of non-limiting example, with reference to the accompanying diagrammatic drawings.

In the drawings.

DETAILED DESCRIPTION

Figure 1:
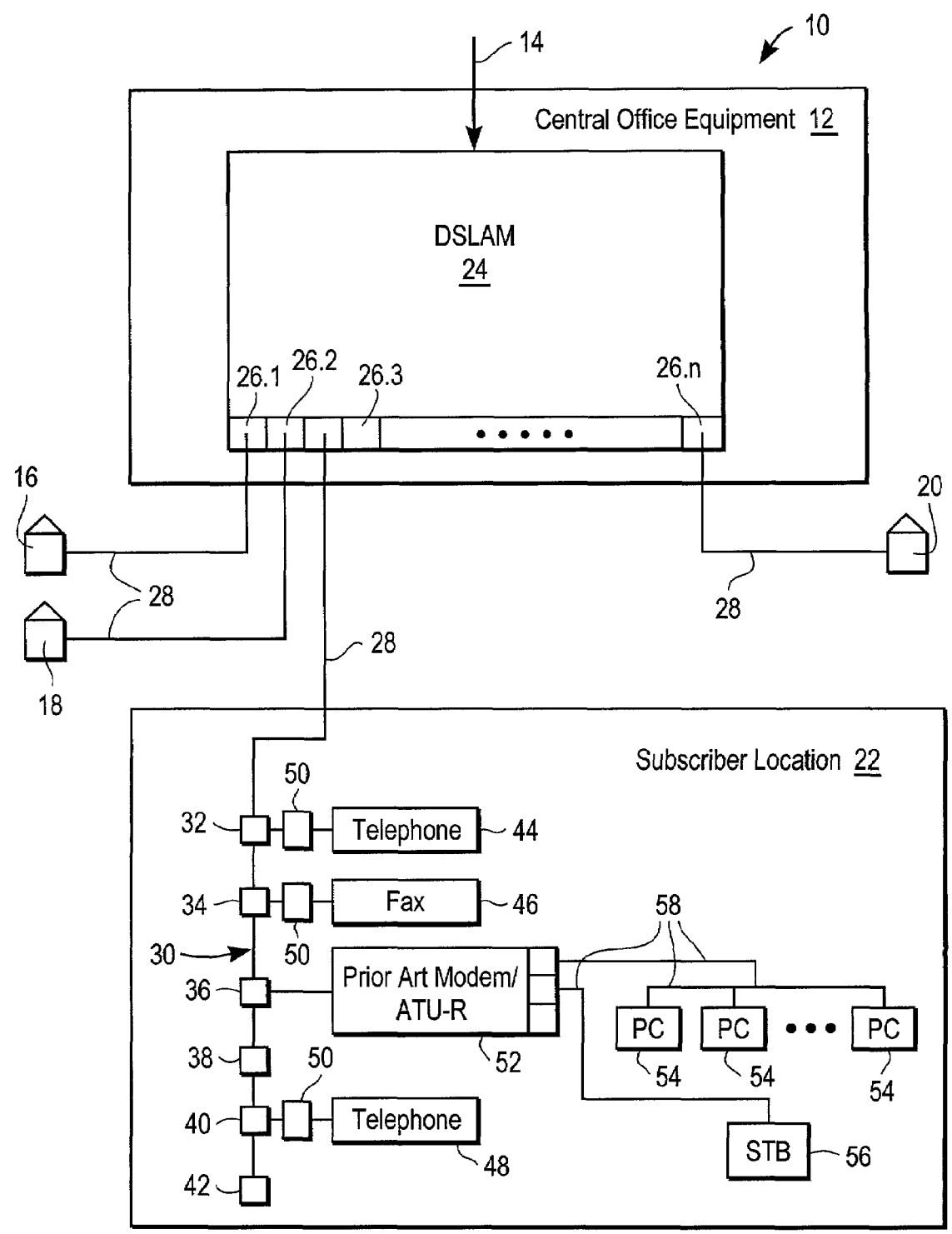
FIG. 1 shows a schematic block diagram of a prior art system for distributing broadband content to a plurality of subscribers in a point-to-point fashion.

A method and system, with their associated components, is described. In the following description, for purposes of explanation, numerous specific details are set forth in order to provide a thorough understanding of the present invention. It will be evident, however, to one skilled in the art that the present invention may be practiced without these specific details.

Referring to the drawings, reference numeral 10 generally indicates a prior art system for communicating broadband content to a plurality of client premises or subscriber locations 16-22. The system 10 includes central office equipment 12 which receives broadband content via a communication line 14 and selectively distributes the content to the subscriber locations 16-22 via a DSL Access Multiplexer (DSLAM) 24. Accordingly, the DSLAM 24 includes a plurality of subscriber ports or central office transmitter units (TU-C) 26.1-26.n that are connected to electronic apparatus at the subscriber location 22 via communication line 28. The communication line 28 is typically a twisted pair of copper wires that telephone companies install to provide telephone services to the subscriber locations 16-22.

As mentioned above, the communication line 28 is typically standard telephone wiring that terminates in a telephone wiring installation 30 in a dwelling at the subscriber location 22. In these circumstances, a plurality of telephone access points 32-42 is typically provided throughout the dwelling and, at each of these access points 32-42, electronic apparatus or devices may be connected. For example, a telephone 44 may be connected at the access point 32, a fax machine 46 may be connected at the access point 34, and a further telephone 48 may be connected at the access point 40. Each of the aforementioned apparatus 44-48 is connected via a filter 50 in a conventional fashion. However, in order to provide broadband content to suitable electronic apparatus, a gateway in the form of a prior art DSL modem 52 is connected to one of the access points 32-42, for example the access point 36, and distributes broadband content to customer specific apparatus such as a plurality of personal computers (PCs) 54, a set top box (STB) 56, or the like. It is to be noted that in the prior art configuration, the STB 56 and the PCs 54 are not directly connected to the telephone wiring installation 30 in that they require a gateway such as the DSL modem 52 to request and receive broadband content. If the customer specific apparatus is located remote from the gateway, a separate independent wiring network 58 is required in addition to the telephone wiring installation 30. Despite the inconvenience of setting up this independent wiring network 58, it also results in additional costs.

Figure 2:
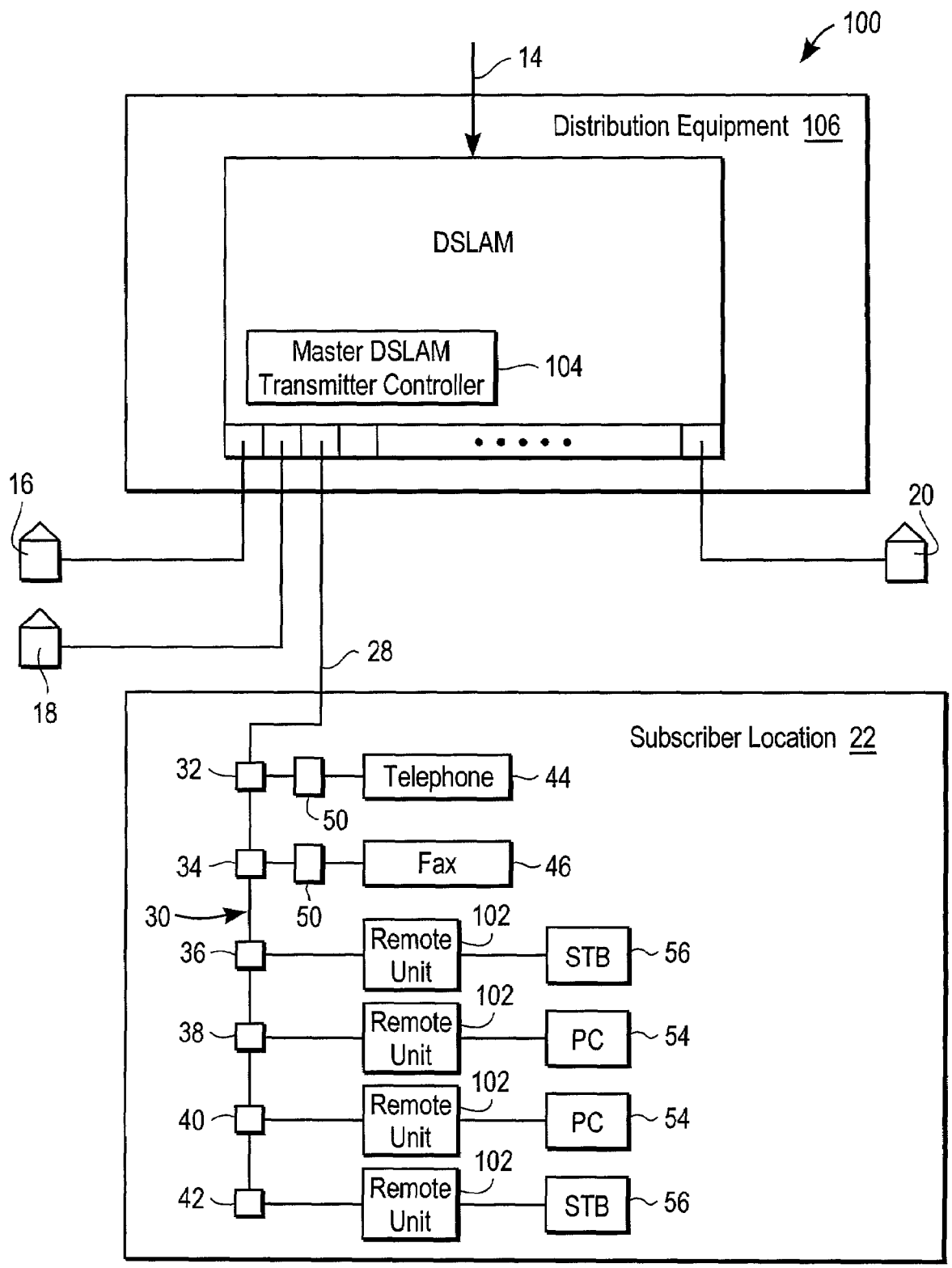
FIG. 2 shows a schematic block diagram of a system, in accordance to the invention, for distributing broadband content to a plurality of users in a multi-drop fashion.

Referring in particular to FIG. 2 of the drawings, reference numeral 100 generally indicates a system, in accordance to the invention, for distributing broadband content to a plurality of subscriber locations 16-22 in a multi-drop fashion. Unlike the prior art system 10, the system 100 is arranged in a multi-drop fashion in which a plurality of remote units 102 are connected directly to the telephone wiring installation 30 provided, for example, in a house, apartment, office or the like. The wiring installation 30 is connected to the communication line 28. Accordingly, broadband communicated via the distribution equipment 106 may be tapped off from a communication line at any one of the telephone access points 32-42 provided within the dwelling. Thus, no gateway in the form of a modem 52 is required in addition to further dedicated wiring 58 as in the case of the prior art (see FIG. 1). As described in more detail below, the system 100 includes a master transmitter controller 104 included at the distribution equipment 106, also in accordance with the invention. The master transmitter controller 104 controls operation of each remote unit 102 so that only a single remote unit 102 communicates or transmits upstream data at any given time as described in more detail below. The distribution equipment 106 and remote units 102 are configured communicate very-high-bit rate DSL (VDSL) via the communication line 28. It is however important to appreciate that the invention can be applied to any other type of DSL (xDSL).

Figure 3:
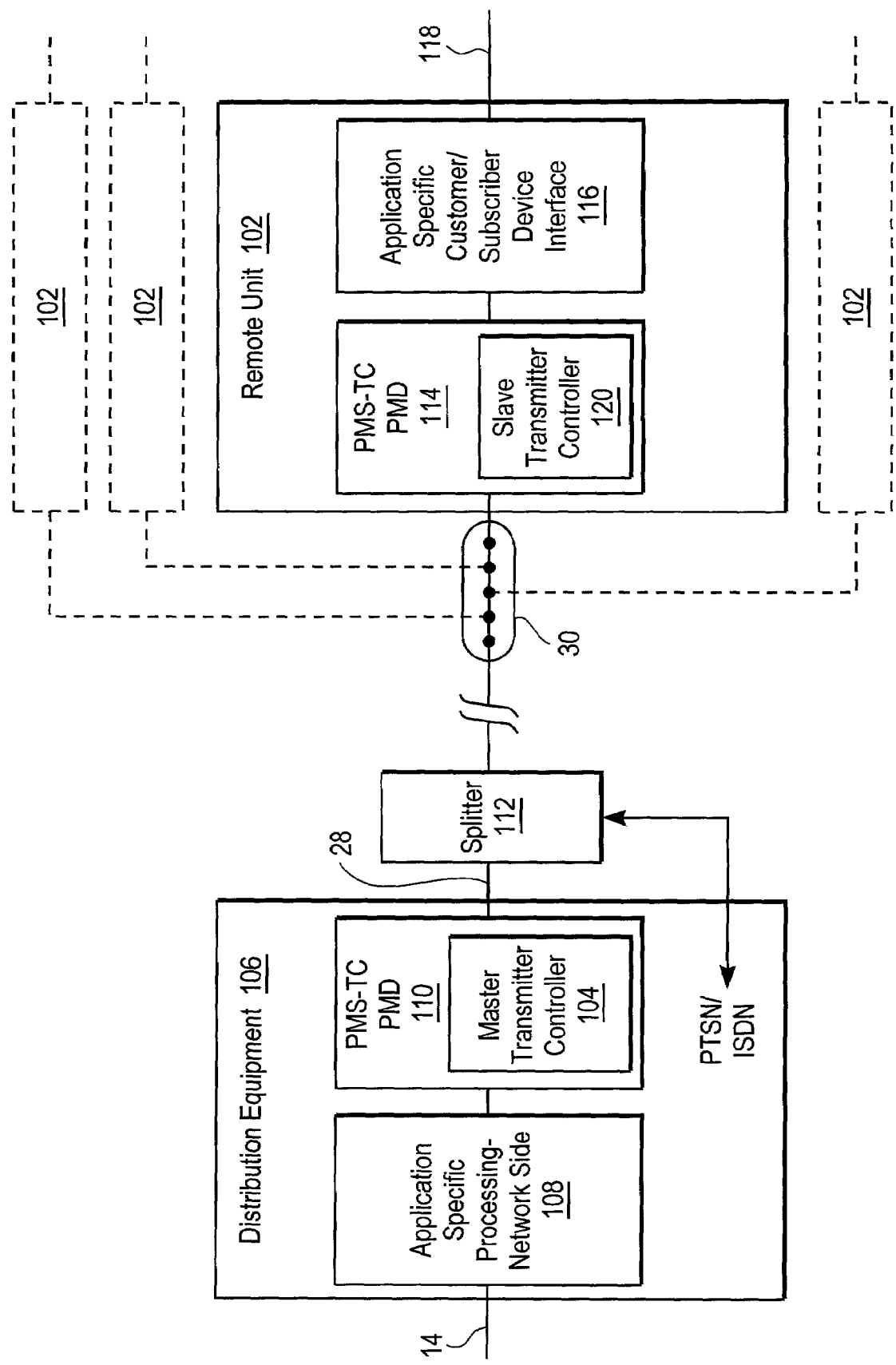
FIG. 3 shows a more detailed schematic block diagram of distribution equipment and a remote unit, both in accordance with the invention, of the system of FIG. 2.

Referring in particular to FIG. 3 of the drawings, the distribution equipment 106 includes application specific processing components 108 which interface the distribution equipment 106 to an exchange via which broadband content is provided. The distribution equipment 106 may thus define a transmitter unit (TU-O) at an optical network unit (ONU), which converts digital data to and from continuous-time physical-layer VDSL signals communicated via the communication line 28. The distribution equipment 106 may be located at a central office when VDSL is deployed from the exchange, or located in a cabinet when VDSL is deployed from a midloop location different from the central office. It is however to be appreciated that the distribution equipment 106 may be located at any other suitable point in a communication network.

The distribution equipment 106 further includes physical medium specific transmission convergence (PMS-TC) components and physical medium dependent (PMD) components 110, which interface the application specific components 108 to the communication line 28. The components 108 and 110 may be similar to conventional components currently used in a VDSL network. However, unlike the prior art system 10, the distribution equipment 106 includes the master transmitter controller 104 which inserts control bits into VDSL frames communicated to each remote unit 102 which, in response thereto, enters a different mode of operation as described in more detail below. In a similar fashion to a conventional VDSL network, the system 100 includes a service splitter 112 for extracting voice data communicated by a public switched telephone network (PSTN) or integrated services digital network (ISDN) line. The service splitter 112, in a conventional fashion, allows PSTN signals to occupy the same physical medium as the VDSL signal.

The remote unit 102 defines a VDSL transmitter unit at client premises or subscriber location 16-22, which converts digital data to or from continuous-time physical-layer VDSL signals for communication via the communication line 28. In particular, the remote unit 102 includes physical medium-specific transmission convergence (PMS-TC) and physical medium-dependent (PMD) components 114. The components 114 interface the remote unit 102 to the communication line 28 and are configured to communicate VDSL frames to the distribution equipment 106. Further, the remote unit 102 includes at least one application specific (customer/subscriber device or apparatus) interface 116 which interfaces the remote unit 102 via a communication line 118 to the STABS 56, the PCs 54, or the like. Accordingly, each remote unit 102 may have one or more application specific interfaces 116 configured to supply broadband content to one or more user devices or apparatus. In less sophisticated embodiments, the application specific interface 116 is configured to supply only data thereby to render the remote unit 102 suitable for interfacing the PC 54 to the Internet using VDSL technology. In other embodiments, the application specific interface 116 is configured to have a co-axial output so that it can interface with the STB 56 and thereby provide video content. It is however to be appreciated that one or more application specific interfaces 116 may be included in each remote unit 102 so that it may drive different user devices.

The components 114 and 116 may resemble conventional components, however, unlike the prior art components, the remote unit 102 includes a slave transmitter controller 120 which, in response to authorization data provided by the distribution equipment 106 in the VDSL frame, controls operation of the remote unit 102 so that only one remote unit 102 communicates upstream data at any given time. It is to be appreciated that the master transmitter controller 104 and slave transmitter controller 120 may be implemented by software modules that control operation of the distribution equipment 106 and remote unit 102 respectively.

Figure 4:
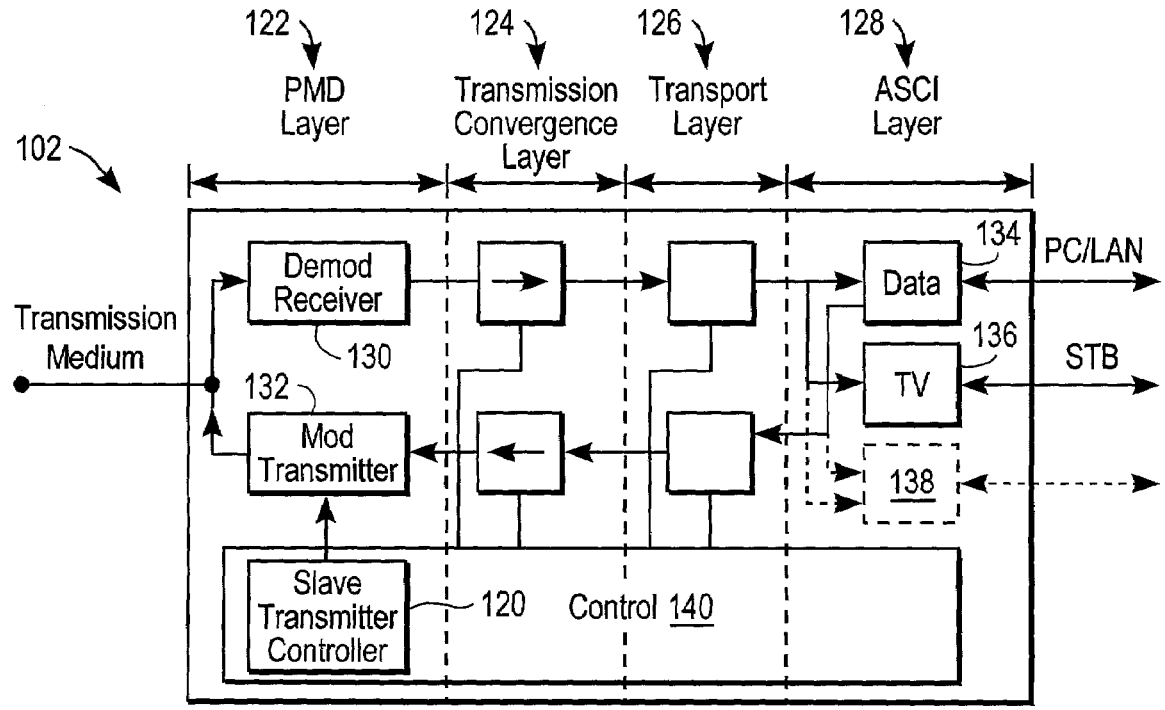
FIG. 4 shows a more detailed schematic block diagram of the remote unit.

A more detail block diagram of the remote unit 102 is shown in FIG. 4. From a functional point of view, the remote unit 102 includes a physical medium-dependent (PMD) layer 122, a transmission convergence (TC) layer 124, a transport layer 126, and application specific customer interface (ASCII) layer 128. These layers correspond to the components 114 and 116 of FIG. 6. The PMD layer 122 includes a demodulator or receiver 130, a modulator or transmitter 132, and the slave transmitter controller 120 which, as mentioned above, is typically in the form of a software module operable to enable and disable the transmitter 132 in response to the authorization data. In the embodiment depicted in FIG. 4, the ASCII 116 includes a data interface 134 for driving the PC 54 or local area network (LAN), and a video interface for driving the STB 56. Further ASCII 138 may be provided for various other electronic devices for receiving and transmitting broadband content. The remote unit 102 includes a control component 140 that controls operation of its various modules and components.

Figure 5:
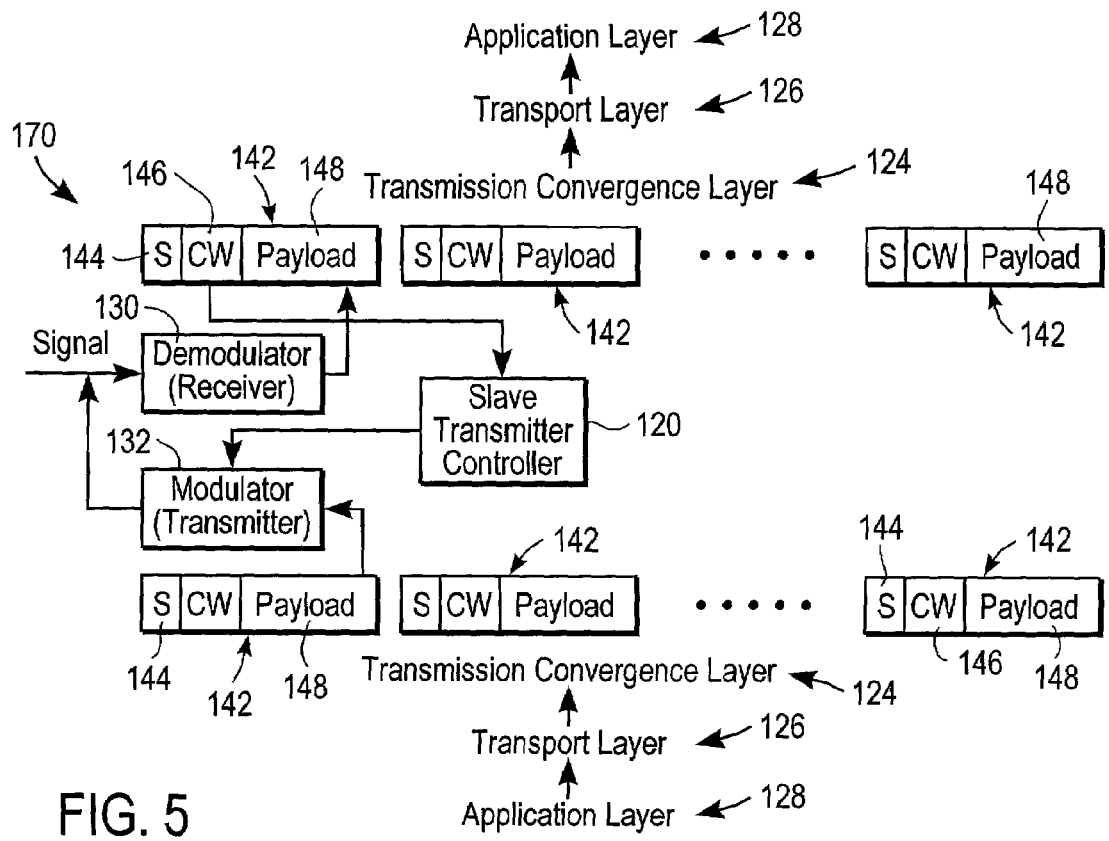
FIG. 5 shows a schematic diagram of a various functional layers of the remote unit of FIG. 4.
Figure 7:
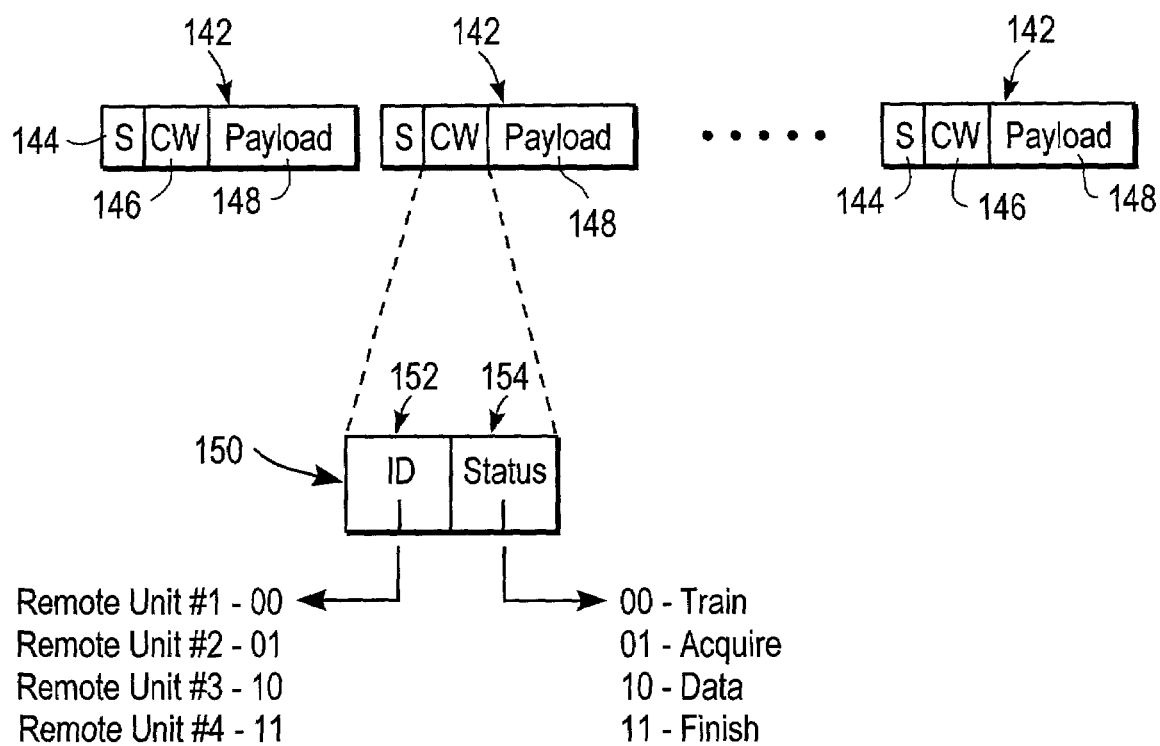
FIG. 7 shows a schematic representation of a VDSL frame including authorization data that controls operation of the remote units connected directly to a DSL communication line.

As mentioned above, the distribution equipment 106 and remote unit 102 are configured to communicate broadband content by VDSL signals. The content is typically included in VDSL frames 142 (see FIGS. 5 and 8). Each VDSL frame 142 includes, inter alia, syncword octets 144, three control octets 146, and a payload portion 148. In terms of standard VDSL conventions, such as those provided by Committee T1—Telecommunications, Working Group T1E1.4(DSL Access), T1E1.4/2001-009R4 and T1E1.4/4/2001-011, four bits of a control 3 octet are reserved for proprietary applications (see FIG. 7). The four bits reserved for proprietary applications define the authorization data 150 that includes two bits defining identification data 152, and two bits defining status data 154. As the identification data 152 has two bits available, it can identify up to four remote units 102 and, the two bits of the status data 154 can define up to four different modes of operation of the particular remote unit 102 identified by the identification data 152. In the embodiment depicted in the drawings, the following four modes of operation are defined. A "Train" mode during which the distribution equipment issues Train commands to train the remote unit 102 in a similar fashion to that conventionally done with VDSL devices, an "Acquire" synchronization mode in which the particular remote unit 102 in response to an Acquire command transmits data in order to establish synchronization with the distribution equipment 106, a "Data" transmission mode in which the particular remote unit 102 is commanded or authorized to include data in the payload portion 148 of the VDSL frame 142 for communication to the distribution equipment 106, and a "Finish" mode in which the distribution equipment 106 issues a Finish command that instructs the particular remote unit 102 to terminate communication of data.

When the system 100 is in its "Train" mode of operation, three communication link-training types are typically performed. In particular, a cold start of the distribution equipment 106 or TU-O, a cold start of the remote unit 102, and a warm start of the remote unit 102 may be performed. When the distribution equipment 106 performs a cold start, typically all remote units 102 or TU-R links are brought down and then brought up one by one. Accordingly, this typically results in a complete service interruption and is thus only done when absolutely necessary. For example, such a cold start may be preformed after the installation of any additional remote units 102, after any maintenance or re-provisioning work is carried out, or in the event of one or more of the remote units 102 being unable to maintain or restore satisfactory operation using its start procedures. It is important to appreciate that conventional prior art training procedures may be included in the training procedures of the system 100.

During the cold start at the distribution equipment 106, the distribution equipment 106 executes conventional VDSL link-training commands to each particular remote unit 102 that is identified and controlled by the authorization data 150. The identification data 152 of the authorization data 150 may be pre-assigned to each particular remote unit 102 or assigned during the link-training mode of operation. When the identification data 152, which uniquely identifies the particular remote unit 102, is pre-assigned, each remote unit 102 is then configured to wait unit it recognizes its identification data (as described in more detail below) before it transmits a response to the distribution equipment 106. However, when the identification data 152 is assigned during the link training procedure, some form of collision resolution, such as random back-off, is typically initiated by the distribution equipment 106 so as to cause only one of the remote units 102 to train at a time. During this process, unique identification data is stored at the remote unit uniquely to identify the particular remote unit 102. For example, a first remote unit 102 at the particular subscriber location 16-22 may be identified by "00", a second remote unit 102 at the particular subscriber location 16-22 may be identified by "01", and so on. Once all the remote units 102 directly connected to the communication line 28 at the particular subscriber location 16-22 have been trained, the distribution equipment 106 then determines which transmission profiles can be used and then commands each remote unit 102 to switch to the particular profile.

A cold start of the remote unit 102 is typically initiated when the remote unit 102 has not been previously trained and is then brought into service, or when the remote unit 102 has had a warm start that has failed. Typically, the warm start is a default for any remote unit 102 that is brought back into service. Upstream communications between the remote units 102 at a particular subscriber location are performed in a time division multiplexed fashion. Accordingly, both cold and warm start training of each remote unit 102 is preformed only during the time slots assigned to that particular remote unit 102. Accordingly, service to other remote units 102 is not interrupted when training on any particular remote unit 102 is performed. The downstream VDSL signal received by the remote unit 102 is checked for satisfactory service and if this is not obtained, a cold start of distribution equipment 106 may be necessary.

During a warm start, the distribution equipment 106 checks the quality of the signal received from the remote unit 102 using previously assigned profiles and, if a suitable connection cannot be established, it will command a cold start of the particular remote unit 102. If a satisfactory connection cannot be established after the cold start, a cold start of the distribution equipment 106 is then performed.

Figure 6:
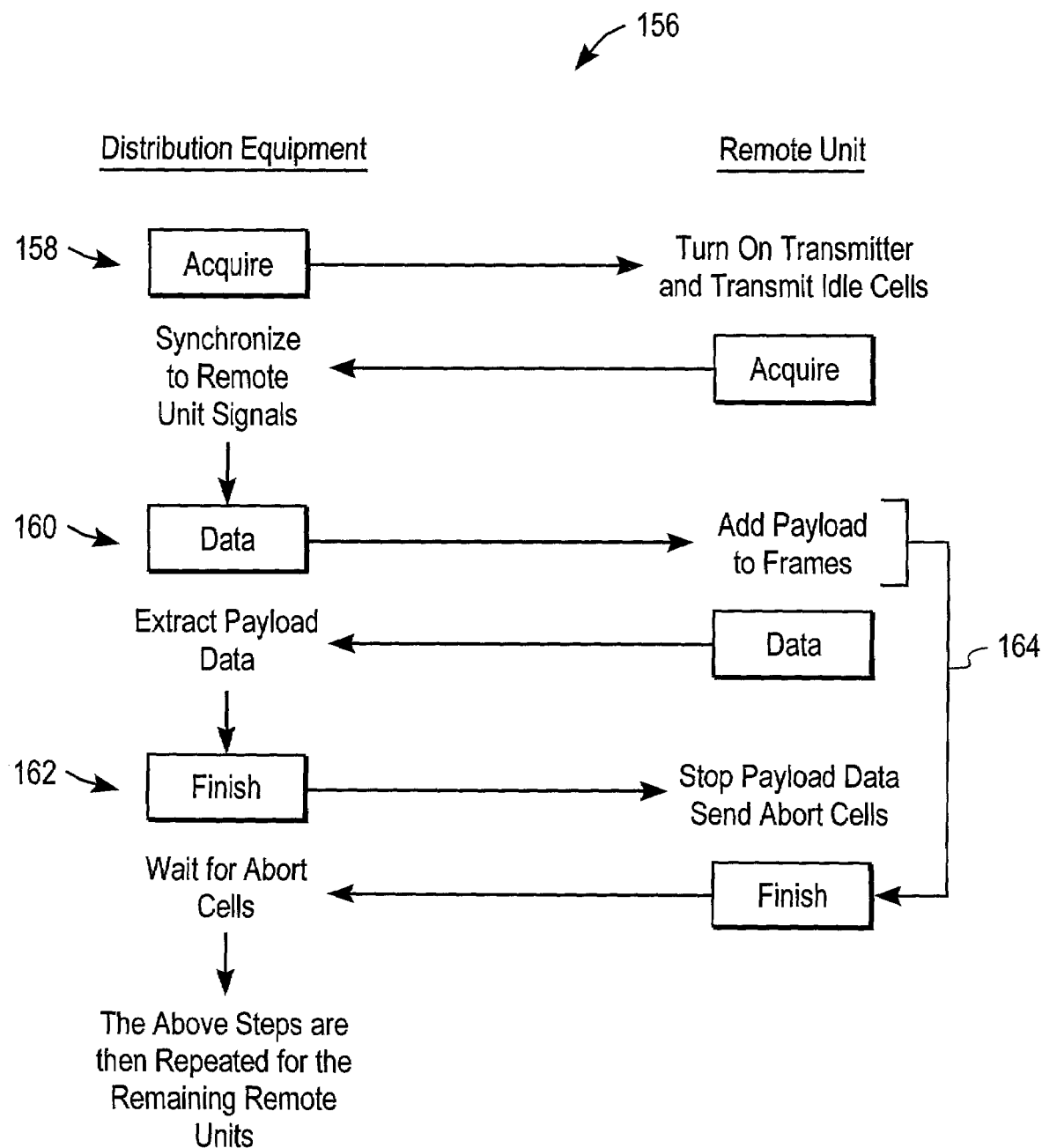
FIG. 6 shows a schematic flow diagram of functional interaction between the distribution equipment and each remote unit.

Referring in particular to FIG. 6, reference numeral 156 shows an example of a sequence of communications between the distribution equipment 106 and a remote unit 102 once it has been trained. As shown at 158, the distribution equipment 106 initially transmits a VDSL frame 142 (see FIG. 7) including identification data 152 that uniquely identifies the particular remote unit 102 with which it requires communication. The remote unit 102 then turns on its transmitter 132 and communicates an idle signal in its payload to the distribution equipment 106 thereby to establish synchronization. Once synchronization has been established, the authorization data 150 instructs the remote unit 102 to enter into the Data transmission mode of operation (generally indicated by reference numeral 160 in FIG. 6) by including an appropriate value in the status data 154. The remote unit 102 then adds its data to the payload portion 148 of the VDSL frame 142 and communicates it via the communication line 28 to the distribution equipment 106. As mentioned above, upstream data is communicated in VDSL frames in a time division multiplexed fashion and, accordingly, the distribution equipment 106 may limit the amount of bandwidth allocated to each particular remote unit 102 dependent upon the type of electronic device(s) or apparatus which it is configured to interface with. For example, greater bandwidth may be given to internet data streams than to video channel change control messages. Once the particular remote unit 102 has communicated its data, the distribution equipment 106 then instructs the remote unit 102 to terminate transmission by sending the Finish command code in the status data 154. If the remote unit 102 that is authorized to transmit, has no data to transmit, then it may immediately transmit an abort signal, as shown by arrow 164. The above-mentioned procedure is then repeated for each of the remaining remote units 102 connected to the communication line 28.

The payload portion 148 of an upstream VDSL frame can contain information corresponding to the current status or mode of operation of the particular remote unit 102. This typically occurs during the Train mode of operation, during an idle pattern in the Acquire mode of operation, either idle or PDU during data an abort pattern during Finish. The actual pattern of the payload signals included in the payload portion 148 will be dependent upon the particular data encapsulation code that is used in this system 100.

In a downstream direction, when a remote unit 102 recognizes its unique identification bits from the identification data 152, it enables its transmitter 132 and maintains transmission until the received identification data 152 changes. When the particular remote unit 102 is no longer authorized to transmit, the distribution unit 106 changes the identification data 152 to identify another remote unit 102 that then, in a similar fashion, enables its transmitter 132. In an upstream direction in which the transmitter 132 of an identified remote unit 102 transmits VDSL frames 142 to the distribution equipment 106, the data included in the identification data 152, of the control word 146 of the VDSL frame 142, is the unique identification of the particular remote unit 102. Thus, the distribution equipment 106 may confirm that the particular remote unit 102 which it has authorized to transmit is in fact transmitting. VDSL frames are transmitted in both upstream and downstream directions.

A description of the various modes of operation of a specific embodiment of a remote unit 102 is provided below:

1. To bring up a link to a particular remote unit 102, the distribution equipment 106 communicates a Train command via the status data 154 and uses the Operations Channel of a VDSL system in the normal manner. The remote unit 102 then enters the Train mode of operation, echoes the Train command, and responds to the Operations Channel commands. When the training procedures have been completed and, accordingly, the remote unit 102 connected to the communication line 28 has been trained, or a further remote unit 102 which has been connected has been trained, the distribution equipment 106 proceeds to a normal mode of operation.

2. In the normal mode of operation, the distribution equipment 106 selects a particular remote unit 102 that is authorized to transmit and communicates the Acquire command in the status data 154 of the VDSL frame 152. The selected remote unit 102 responds by echoing the Acquire command and places Idle data in its payload. The distribution equipment 106 typically maintains this state until it has synchronized to the VDSL carrier(s), framing and Idle data.

3. When the distribution equipment 106 has synchronized to the received signal, it changes the status data from the Acquire to indicate the Data mode of operation. The remote unit 102 responds by echoing the Data status and places transmit data traffic into the payload portion 148. The distribution equipment 106 maintains this state of operation until either the slot time expires, or the remote unit 102 indicates it has no more data that it wishes to transmit.

4. To terminate transmission, the distribution equipment 106 indicates Finish command in the status data 154. Upon receiving this command, the remote unit 102 echoes this status and terminates the placement of any more data into the payload portion 148. When the last payload data unit has been sent, the remote unit 102 places Abort data in its payload portion 148.

5. When the distribution equipment 106 has received the Finish confirmation command and observed Abort data in the payload, it changes the identification data 152 and status data 154 to acquire the next remote unit 102. The current remote unit 102 maintains its transmission until it detects that its unique identification is no longer present in the identification data 152 that it receives.

6. The selected remote unit 102 may indicate the Finish state at any time to indicate that it has no more payload data to send. In this situation, it places IDLE data into the payload portion 148 if the distribution equipment 106 is authorizing it to transmit data and providing it with an Acquire command. If the distribution equipment 106 is providing Data or Finish commands, and the remote unit 102 has no more data to transmit, it includes Abort data in the payload portion 148.

7. In the event that a remote unit 102 does not respond to its slot for a particular time-out period, the distribution equipment 106 reverts to communicating a Train command in subsequent VDSL slots, until communication with the remote unit 102 is once again re-gained.

In a downstream direction in which the distribution equipment 106 communicates broadband content to a particular remote unit 102, the VDSL signal is received (see FIG. 5) by the remote units 102 and each remote unit 102 demodulates the VDSL signal by means of its receiver or demodulator 130 to extract the relevant frame information from the VDSL frame 142 in the transmission convergence layer 124. From the data in the payload portion 148 of the VDSL frame 142, each remote unit 102 identifies it is being addressed and, accordingly, the data included in the payload portion 148 is destined for the particular remote unit 102. When the particular remote unit 102 is being addressed, the data is conveyed via the transport layer 126 to the application layer 128 for communication to the user device or apparatus. In addition to analyzing the payload portion 148 to ascertain whether or not the data included in the VDSL frame 142 is for the particular remote unit 102, each remote unit 102 also extracts control word data 146 to obtain the identification data 152 and status data 154 from the authorization data 150. In response to the authorization data 150, the slave transmitter controller 120 selectively enables the transmitter or modulator 132 of the particular remote unit 102. In particular, when the remote unit 102 identifies its particular identification value is included in the control word 146, the slave transmitter controller 120 by means of a software switch enables the transmitter 132. When the transmitter 132 is enabled, the remote unit 102 includes its payload in the VDSL frame 142 which is then communicated via the communication line 28 to the distribution equipment 106. Upstream data that the remote unit 102 transmits is obtained from the user apparatus or device via the application specific layer 128 and the transport layer 126 and the transmission convergence layer 124. In the receive direction, the payload is extracted as shown at 160 whereafter the address to which the downstream payload is destined is filtered from the payload by discarding payload data units which do not have an address assigned to the particular remote unit 102 (see block 162). Thereafter, as shown at block 164, protocol data units are built from the payload data units for the particular remote unit 102.

Figure 8:
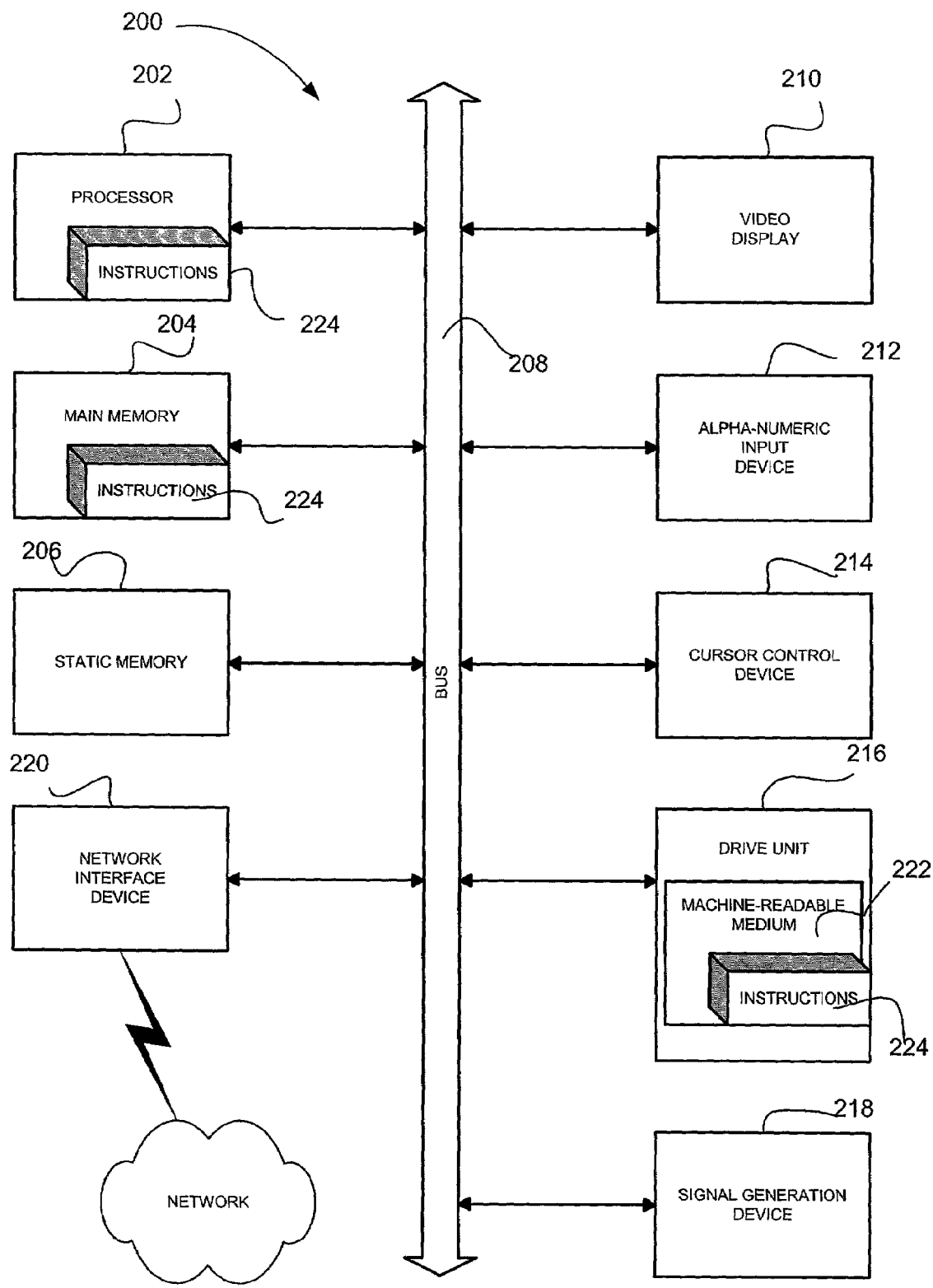
FIG. 8 shows a schematic block diagram of a computer system which may be used in the system.

FIG. 8 shows a diagrammatic representation of machine in the exemplary form of a computer system 200 within which a set of instructions, for causing the machine to perform any one of the methodologies discussed above, may be executed. In alternative embodiments, the machine may comprise a network router, a network switch, a network bridge, or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 may also include an alpha-numeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system, including their various components, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense

What is claimed is:

1. A remote unit for receiving broadband services via a communication line, the remote unit comprising:
   interface circuitry to interface the remote unit to a user device;
   a receiver connected to the interface circuitry for receiving downstream data from distribution equipment;
   a transmitter connected to the interface circuitry, the transmitter transmitting upstream data to the distribution equipment upon authorization by the distribution equipment;
   a transmitter control module that enables and disables the transmitter in response to authorization data received by the remote unit; and
   wherein the remote unit is configured to exchange VDSL frames with the distribution equipment, the authorization data is placed in four bits reserved for proprietary use in a control word of a VDSL frame header, the remote unit is further configured to extract the authorization data and control operation of the transmitter in response to the value of the bits, two of the four bits of authorization data define identification data and the remote unit identifies from these bits when it is authorized to enable its transmitter, the remaining two of the four bits of authorization data provide up to four status commands and the remote unit is further configured to respond to the status commands by entering at least one state of operation selected from a group including a train state for the distribution equipment to train the remote unit, an acquire synchronization state to acquire synchronization with the distribution equipment, a send data state in which the remote unit sends data to the distribution equipment, and a finish state in which the remote unit terminates transmission of its data.

2. The remote unit of claim 1, which is configured to add its payload to a VDSL frame when commanded to do so in the send data state.

3. The remote unit of claim 1, wherein the interface circuitry includes at least one of a data module and a video module.

4. The remote unit of claim 1, wherein the interface circuitry is an application specific customer interface configured to interface the remote unit to a set top box to provide broadband content in response to specific requests from the remote unit transmitted to the distribution equipment when the remote unit is authorized to transmit.

5. The remote unit of claim 1, wherein the remote unit is connected directly to a communication line and configured to identify its associated address to process downstream data, and transmit upstream data in VDSL frames in a time division multiplexed fashion.

6. The remote unit of claim 1, which requests content from an Internet Service Provider when it is authorized to transmit.

7. The remote unit of claim 1, which requests content from a broadband video content provider when it is authorized to transmit.

8. Distribution equipment comprising:
   a network interface to interface the distribution equipment to at least one broadband content provider; and
   a communication interface to interface the distribution equipment to a DSL line to which a plurality of remote units are connectable, the distribution equipment being operable to control upstream transmission of data by each remote unit, and
   wherein the communication interface is a DSL interface configured to communicate with each remote unit via very-high-bit-rate DSL (VDSL) signals, the VDSL signals include a VDSL frame having four bits of space reserved for proprietary use, the communication interface places four bits of authorization data in the four bits of space, two of the bits of authorization data define identification data to selectively identify one of up to four remote units connected to the communication line, and the two remaining bits provide up to four status commands to the remote unit identified by the identification data, and the status commands are selected from a group including a train command to train a remote unit, an acquire synchronization command to establish synchronization between a remote unit and the distribution eguipment, a send data command to authorize a remote unit to send data, and a finish command to instruct a remote unit to terminate transmission of its data.

9. The distribution equipment of claim 8, wherein the authorization data authorizes activation of a transmitter of a particular remote unit.

10. The distribution equipment of claim 8, which communicates broadband content to each remote unit in response to a specific request from the remote unit when the distribution equipment authorizes the remote unit to transmit.

11. The distribution equipment of claim 8, wherein the remote units are connected directly to a DSL line and the distribution equipment transmits downstream data including an address associated with a remote unit, and receives upstream data from the remote units in a time division multiplexed fashion.

12. A method of controlling operation of a remote unit for receiving broadband services via a DSL line from distribution equipment, the method comprising:
   receiving downstream data from the distribution equipment, the downstream data including very-high-bit-rate DSL (VDSL) signals and authorization data;
   extracting the authorization data from the downstream data received by the remote unit
   enabling and disabling a transmitter of the remote unit in response to the authorization data received by the remote unit;
   causing the remote transmitter to enter at least one state of operation in response to the authorization data received by the remote unit, the state of operation being selected from a group including:
      a train state for the distribution equipment to train the remote unit,
      an acquire synchronization state to acquire synchronization with the distribution equipment,
      a send data state in which the remote unit sends data to the distribution equipment, and
      a finish state in which the remote unit terminates transmission of its data; and
   transmitting upstream data to the distribution equipment upon authorization by the distribution equipment; and
   wherein the VDSL signals include a VDSL frame, the authorization data is placed in four bits reserved for proprietary use in a control word of a VDSL frame header, the authorization data includes two bits defining identification data and two bits providing up to four status commands, the step enabling and disabling of the transmitter is dependent on the value of the identification data, and the step of causing the remote transmitter to enter at least one state of operation is dependent on the value of the status commands.

13. The method of claim 12, which includes adding payload data to a VDSL frame when instructed to do so in the send data state.

14. The method of claim 12, which includes requesting broadband content when the remote unit is authorized to transmit.

15. The method of claim 12, which identifying an associated address of the remote unit to process downstream data, and transmitting upstream data in VDSL frames in a time division multiplexed fashion.

16. The method of claim 12, which includes requesting content from an Internet Service Provider when authorized to transmit.

17. The method of claim 12, which requests content from a broadband video content provider when authorized to transmit.

18. The method of claim 12, which includes communicating broadband content to each remote unit in response to a specific request from the remote unit when the distribution equipment authorizes the remote unit to transmit.

19. The method of claim 12, which includes receiving upstream data from the remote units in a time division multiplexed fashion.

20. A method of controlling operation of a plurality of remote units connected to a DSL line whereby the remote units receive and transmit very-high-bit-rate DSL (VDSL) signals via the DSL line, the method comprising
   transmitting authorization data from distribution equipment to the remote units,
   wherein the VDSL signals include a VDSL frame, the authorization data is placed in four bits reserved for proprietary use in a control word of a VDSL frame header, two bits of the authorization data define identification data to selectively identify one of up to four remote units connected to the communication line, and two bits of the authorization data provide up to four status commands to the remote unit identified by the identification data, and the status commands are selected from a group including a train command to train a remote unit, an acquire synchronization command to establish synchronization between a remote unit and the distribution eguipment, a send data command to authorize a remote unit to send data, and a finish command to instruct a remote unit to terminate transmission of its data.

21. The method of claim 20, wherein the method further comprises repeating the step of transmitting authorization data and the authorization data is sequentially changed thereby communicating status commands to each remote unit, one at a time.

22. The method of claim 20, wherein the remote unit identified by the identification data adds its payload to a VDSL frame when instructed to do so by the send data command.

23. The method of claim 20, wherein broadband content is provided to each remote unit in response to a specific request from the remote unit transmitted to the distribution equipment when the remote unit is authorized to transmit.

24. The method of claim 20, wherein the authorization data authorizes activation of a transmitter of a particular remote unit.

25. A system for providing broadband services to a client premise, the system including:
   distribution equipment connected to at least one content provider and configured to provide broadband services to the client premise via a communication path, and
   a plurality of remote units at the client premise, each connected to the communication path,
   wherein the distribution equipment is configured to communicate at least three bits of authorization data to the remote units at the client premise over the communication path, at least one bit of the authorization data identifies one of the plurality of remote units, two bits of the authorization data provides a selected status command to the identified remote unit, the identified remote unit, in response to the selected status command, enters a state of operation selected from a group of states including a train state for the distribution equipment to train the remote unit, an acquire synchronization state to acquire synchronization with the distribution equipment, a send data state in which the identified remote unit sends data to the distribution equipment, and a finish state in which the identified remote unit terminates transmission of its data.

26. The system of claim 25, wherein each remote unit comprises:

interface circuitry to interface the remote unit to a user device, a receiver connected to the interface circuitry for receiving downstream data from distribution equipment, and a transmitter connected to the interface circuitry, the transmitter transmitting upstream data to the distribution equipment upon authorization by the distribution equipment, and a transmitter control module that enables and disables the transmitter in response to authorization date received by the remote unit.

27. The system of claim 25, wherein the distribution equipment comprises:

a network interface to interface the distribution equipment to at least one broadband content provider; and a communication interface to interface the distribution equipment to the communication path.

* * * * *